United States Patent Office.

DANA SLADE, OF CHICAGO, ILLINOIS.

Letters Patent No. 112,858, dated March 21, 1871.

IMPROVEMENT IN COMPOUNDS FOR TREATING CATARRH, &c., BY INHALATION.

The Schedule referred to in these Letters Patent and making part of the same.

I, DANA SLADE, of Chicago, in the county of Cook and State of Illinois, have invented a certain Compound called Inhalent, for Catarrh, Sore Throat, and Bronchitis.

The nature of my invention consists in mixing carbolic acid, chlorate of potash, and cochineal in water, making a liquid inhalent.

That those skilled in the art may understand how to prepare my compound I will describe the same with particularity.

I take forty grains of carbolic acid, two grains of chlorate of potash, and one grain of cochineal, and mix them in two ounces of water.

There need be no special pains taken in reference to the temperature of the water, as the temperature of the water in an ordinary living-room will do for the preparation.

The mixture should be well shaken, and put into vessels where it can be kept from the air.

When the solution is used it should be weakened, by the addition of water, to adapt it to the severity of the case. Ordinarily one drachm should be used with two ounces of water. It may be weakened with more or less water, as the case is more or less severe.

It is inhaled in any of the ordinary ways of taking liquid inhalents.

Claim.

I claim—

The mixture or compound called an "inhalent, for catarrh, sore throat, and bronchitis," made of the ingredients in the proportions and for the purposes set forth.

DANA SLADE.

Witnesses:
L. L. COBURN,
HANS F. BRUNS.